United States Patent [19]
Tuzson

[11] 3,891,071
[45] June 24, 1975

[54] TRANSIENT BRAKE APPLICATION UPON ACCELERATOR RELEASE

[75] Inventor: John J. Tuzson, Evanston, Ill.
[73] Assignee: Borg-Warner Corporation, Chicago, Ill.
[22] Filed: Dec. 10, 1973
[21] Appl. No.: 423,382

[52] U.S. Cl............................ 192/3 TR; 188/270
[51] Int. Cl................................. B60k 29/02
[58] Field of Search .................. 192/3 R, 3 TR, 3 S

[56] References Cited
UNITED STATES PATENTS

| | | | |
|---|---|---|---|
| 1,792,750 | 2/1931 | Loughead | 192/3 TR X |
| 2,870,885 | 1/1959 | McIntosh et al | 192/3 TR |
| 3,243,022 | 3/1966 | Humphrey | 192/3 TR |
| 3,753,427 | 8/1973 | Cedar | 123/DIG. 11 |

Primary Examiner—Benjamin W. Wyche
Attorney, Agent, or Firm—James A. Geppert

[57] ABSTRACT

A brake control for a limited brake application of short duration when the accelerator pedal of a vehicle is released suddenly, with the control including a dashpot actuated by the accelerator pedal, a vent valve activated by vacuum created in the dashpot and a brake pedal actuator communicating with a suitable vacuum source acting on both sides of a diaphragm therein. The actuator is operatively connected to the brake pedal, and the vacuum line to one side of the diaphragm has an orifice or restriction therein so that when the vent valve opens, the one side of the diaphragm is vented slowly to atmospheric pressure because of the orifice while the other side is immediately vented to atmosphere pressure, thus causing the actuator to provide a braking pressure which fades after a brief delay.

11 Claims, 2 Drawing Figures

PATENTED JUN 24 1975　3,891,071

TRANSIENT BRAKE APPLICATION UPON ACCELERATOR RELEASE

BACKGROUND AND SUMMARY OF THE INVENTION

The present invention relates to a vehicle brake control, and more particularly to a transient brake control to apply pressure to the vehicle brakes for a short duration upon the sudden release of the accelerator pedal.

Under modern driving conditions, the operator of a motor vehicle is called upon to make numerous quick decisions with regard to accelerating, slowing down or stopping. In high speed situations, there is the necessity of sudden reductions in speed or sudden stops where the interval of a second or fractions of a second saved may mean the difference between the safety of the vehicle and its occupants and the danger of a collision and its attendant damages and possible personal injury.

A proposed solution to this problem of reaction time interval for the operator between the release of the accelerator pedal and application of the brake pedal is to provide an automatic decelerator action for the vehicle after the removal of the operator's foot from the accelerator pedal and before application of pressure on the brake pedal. Faster action and shorter stopping distances have been demonstrated where the accelerator pedal and the brake pedal were combined in a single unit, however, such an arrangement has not met with general acceptance in the industry.

Further attempts have been made to provide automatic deceleration where a predetermined hydraulic pressure is constantly applied to the vehicle brakes upon release of the accelerator pedal. Not only will this system provide an initial deceleration for the time interval between release of the accelerator pedal and actuation of the brake pedal, but a constant drag will be placed on the vehicle as long as the accelerator is not depressed, such as when the vehicle is coasting, idling or stopped on an incline. However, such a system has disadvantages, such as increased brake wear. The present invention obviates the disadvantages of the previous systems while providing an efficiently operating arrangement to aid in emergency stopping in a minimum of time.

Among the objects of the present invention is the provision of a transient brake control which will apply a limited braking pressure to initiate an emergency or sudden stop during the reaction time between the point of removal of the operator's foot from the accelerator pedal and application of pressure to the brake pedal.

Another object of the present invention is the provision of a transient brake control which will be actuated only upon the sudden release of the accelerator pedal by the vehicle operator. A gradual release of the accelerator pedal will not trigger the brake control device.

A further object of the present invention is the provision of a transient brake control wherein sudden release of the accelerator pedal will trigger the brake control to initiate an application of brake pressure to the vehicle brakes, and, if the brake pedal is not actuated to increase the brake pressure, the initial brake pressure will gradually fade after a brief time interval.

Further objects are to provide a construction of maximum simplicity, efficiency, economy and ease of assembly and operation, and such further objects, advantages and capabilities as will later more fully appear and are inherently possessed thereby.

DESCRIPTION OF THE PREFERRED EMBODIMENT

Figure 1:
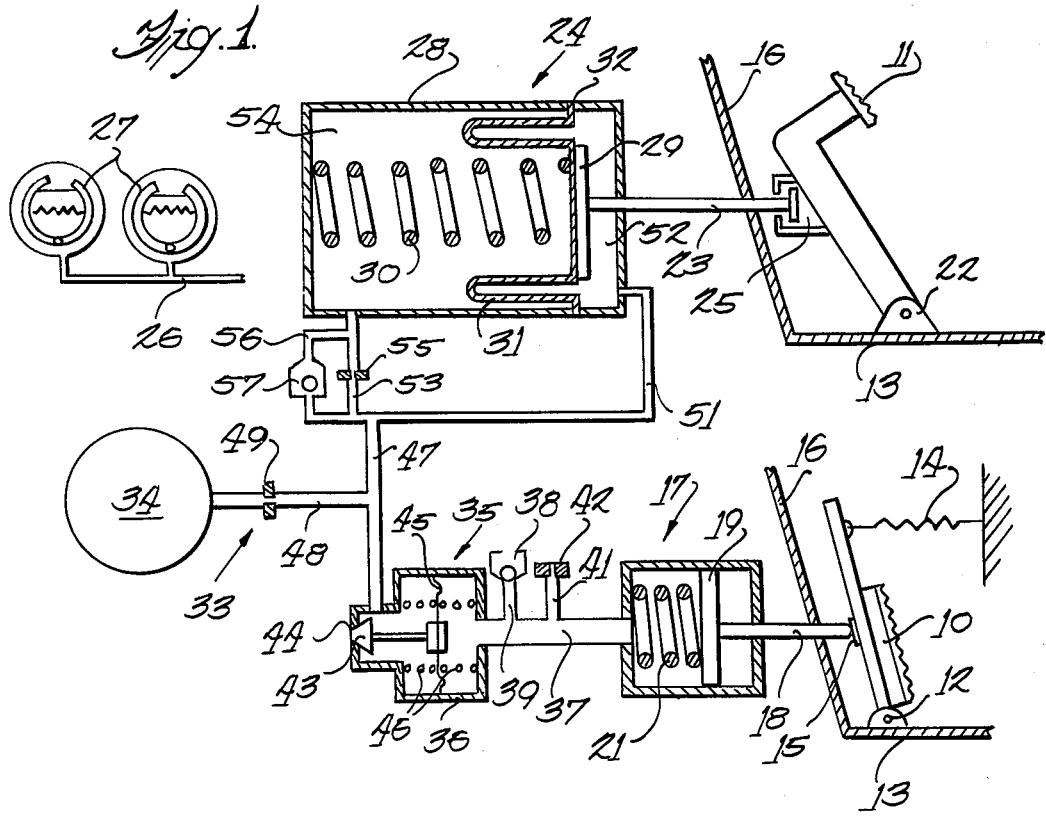
FIG. 1 is a schematic showing of the brake control of the present invention with the accelerator depressed to operate the vehicle.
Figure 2:
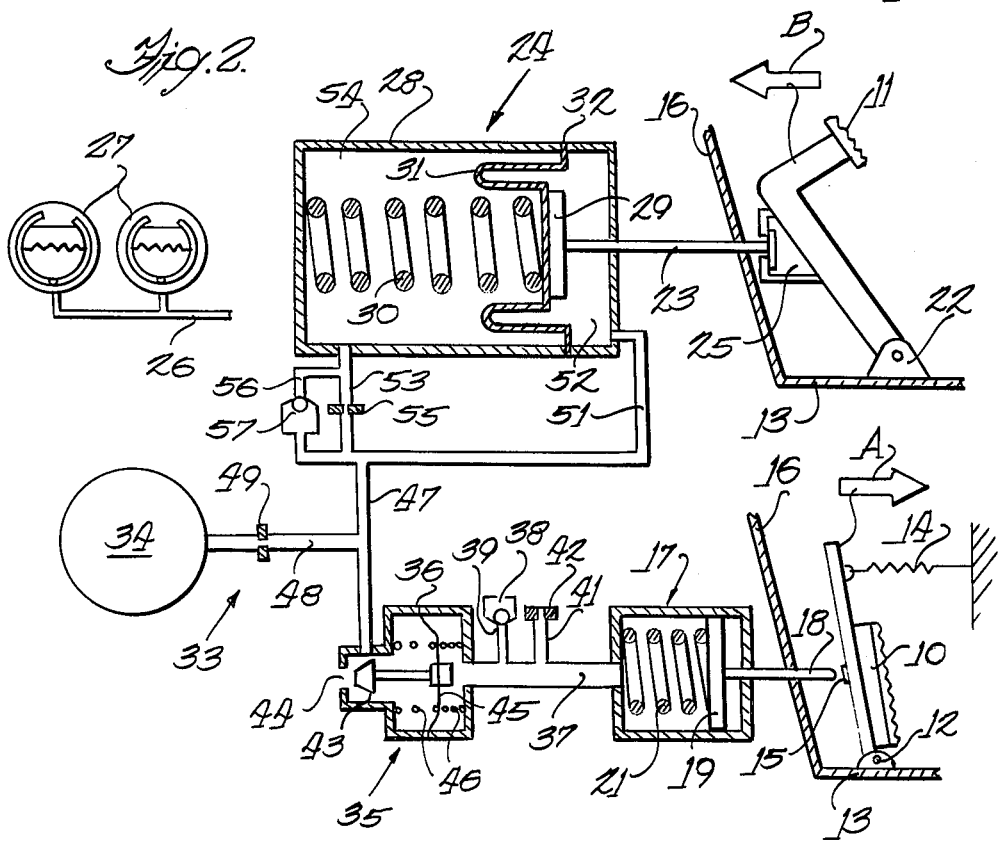
FIG. 2 is a schematic showing similar to FIG. 1, but illustrating the position of the parts upon the sudden relase of the accelerator pedal.

Referring more particularly to the disclosure in the drawings wherein is shown an illustrative embodiment of the present invention, FIGS. 1 and 2 disclose a schematic showing of an accelerator pedal 10 and a brake pedal 11 for a conventional automotive vehicle. The pedal 10 has a suitable linkage (not shown) for the carburetor of the vehicle engine and is pivotally mounted at 12 on the floorboard 13 of the vehicle.

Biasing means 14 acts to return the pedal 10 to an inactive position upon release by the operator, and a piston rod 18 of a dashpot 17 has a free end extending through the vehicle firewall 16 adapted to be engaged by a pad 15 on the pedal 10. The dashpot 17 is suitably secured or mounted onto the opposite side of the firewall and includes a reciprocable piston 19 secured to the opposite end of the rod 18 and a compression spring 21 acting to return the piston 19 and the pedal 10 to the inactive or idling position.

The brake pedal 11 is also suitably pivotally mounted on a pivot bracket 22 mounted on the floorboard 13, and a piston rod 23 for a brake actuator 25 extends through the firewall 16 and is mounted for limited lost motion at 25 to the brake pedal 11. The brake pedal 11 is suitably connected to actuate a master cylinder (not shown) connected by a pressure line 26 to the wheel cylinders of the brakes 27 of the vehicle. The actuator includes a cylinder 28 housing a piston 29 connected to the rod 23, a compression spring 30 tending to bias the piston to the right, as seen in FIG. 1, and a flexible diaphragm 31 having its outer periphery 32 suitably secured in the cylinder 28 and the central portion suitably secured to the piston 29.

A fluid circuit 33 connects both the dashpot 17 and the actuator 24 to a source of vacuum 34, such as the manifold of the vehicle engine (not shown). A vent valve 35 has a housing 36 communicating with the dashpot 17 through a conduit 37, which conduit also contains a check valve 38 in an outlet 39 and an inlet 41 containing a choke or restricted orifice 42; both the inlet and outlet communicating with the ambient air or atmospheric pressure. The check valve 38 allows pressure flow from the conduit 37 through the outlet 39 but prevents flow in the opposite direction. The vent valve 35 includes a valve member 43 closing an inlet 44 for ambient air, and a flexible diaphragm 45 is connected to the valve member 43 and is normally centered by a pair of light spring members 46, 46. A conduit 47 communicates with the housing 36 adjacent the ambient air inlet 44 and is connected to a line 48 containing a restricted orifice 49 leading to the source of vacuum 34.

The conduit 47 is also connected to a line 51 leading to one chamber 52 of the actuator cylinder 28 containing the piston 29 and to a line 53 leading to the chamber 54 at the opposite side of the diaphragm 31 in the cylinder. The line 53 contains a restricted orifice 55 to provide restricted flow therethrough, and a by-pass line 56 containing a check valve 57 circumvents the orifice 55. The check valve 57 is oriented to allow pressure flow from the cylinder 28 to the conduit 47 but prevent reverse flow through the by-pass line 56 to the cylinder.

Under normal circumstances, depression of the accelerator pedal 10 by the vehicle operator moves the piston 19 to the left in the dashpot 17 against the force of the spring 21 and air in the dashpot exits through the outlet 39 past the check valve 38. A gradual release of the accelerator pedal 10 allows the spring 21 to move the piston 19 to the right and casuses air to bleed slowly into the dashpot 17 through the choke 42 in the air inlet 41 and the conduit 37 without a reaction in the remainder of the system. Similarly, depression of the brake pedal 11 to apply the vehicle brakes 27 is not obstructed or hindered by the actuator 24 due to the lost motion connection 25.

However, if the operator suddenly releases the accelerator pedal 10 for the purpose of shifting his foot to the brake pedal 11 for actuation of the vehicle brakes 27, there is a time lag during the transitional movement from the accelerator pedal to the brake pedal. When the pedal 10 is released suddenly, the biasing means 14 causes the pedal 10 to move away from the piston rod 18, as shown by the arrow A, and piston 19 of the dashpot is allowed to move suddenly to the right due to the force of the spring 21 (FIG. 2). Sufficient vacuum is produced in the dashpot 17, the conduit 37 and the vent valve 35, in view of the restricted orifice 42 in the conduit 37, to cause the diaphragm 45 to shift the valve member 43 and open the inlet 44, thus allowing communication of the conduit 47 with ambient air through the inlet 44 of the vent valve 35. While the vent valve 35 is closed, as seen in FIG. 1, both chambers of the actuator 24 are evacuated through the restricted manifold vacuum line 48. When the vent or bleed valve 35 is opened, the one chamber 52 is immediately vented to atmospheric pressure through the line 51 while the opposite chamber 54 is vented slowly through the restricted line 53; the check valve 57 preventing venting through the by-pass line 56. Consequently, a pressure imbalance is created in the actuator 24, and the sudden force acting on the piston 29 and the diaphragm 31 produced by the pressure imbalance is applied to the brake pedal 11 and causes movement of the brake pedal 11, as shown by the arrow B, to actuate the wheel brakes 27. This action provides a limited brake application that occurs for a short interval.

After a brief delay, during which time the chamber 54 is slowly vented to atmospheric pressure through the orifice 55, the sudden force applied to the brake pedal 11 will slowly fade away. Thus, if the operator decides not to depress the brake pedal 11, the braking action is only a momentary drag on the vehicle. Also, once the dashpot 17, the conduit 37, and the vent valve 35, vented to atmospheric pressure through the choke 42, are equalized with respect to pressure, the valve member 43 closes the ambient air inlet 44 and returns the system to the condition of vacuum applied from the source 34 to the vent valve 35 and to both chambers 52 and 54 of the actuator 24.

This action can be repeated whenever the accelerator pedal is suddenly released. The actuator circuit will not, at any other time, impede either the operation of the accelerator pedal or the actuation of the wheel brakes by the operation of the brake pedal. Also, this system does not produce a constant drag on the vehicle whenever the accelerator pedal is released for any reason unless the release is sudden, and then the brake actuation is for a limited time only.

I claim:

1. A transient brake control system for an automotive vehicle having an engine fuel feeding system and a braking system, comprising a control means for the engine fuel feeding system movable between an engine idling position and engine speed-up positions, a separate control means for the vehicle braking system, an actuator for the braking system including a diaphragm operatively connected to said brake control means, a pair of chambers formed on opposite sides of the diaphragm and communicating with a source of vacuum to equalize the pressure in both chambers, a vent valve adapted to be actuated by operation of said engine control means and including a housing having an ambient air inlet at one end, a diaphragm in the housing separating the ends thereof, and a valve member secured to the diaphragm and normally closing said inlet, a vacuum conduit communicating with said vacuum source and extending between one of said chambers and said vent valve, and a branch line extending between the opposite chamber and said conduit and having a restricted orifice therein, said vacuum conduit communicating with said vent valve adjacent said ambient air inlet.

2. A transient brake control system as set forth in claim 1, including a dashpot operatively connected to said engine control means, a conduit extending between said dashpot and the opposite end of the valve housing, and a restricted ambient air inlet communicating with said conduit.

3. A transient brake control system as set forth in claim 2 in which said dashpot includes a reciprocable piston operatively connected to said engine control means.

4. A transient brake control system for an automotive vehicle having an engine fuel feeding system and a braking system, comprising a control means for the engine fuel feeding system movable between an engine idling position and engine speed-up positions, a separate control means for the vehicle braking system, an actuator operatively connected to said brake control means and including a pair of chambers formed on opposite sides of a diaphragm and communicating with a source of vacuum to equalize the pressure in both chambers and a piston in one chamber of said actuator operatively connected to said diaphragm and having a rod operatively connected to said brake control means, a dashpot operatively connected to said engine control means, a vent valve adapted to be actuated by operation of said dashpot, a vacuum conduit communicating with said source of vacuum and extending between said one chamber and said vent valve, and a branch line extending between the opposite chamber in the actuator and said conduit and having a restricted orifice therein.

5. A transient brake control system as set forth in claim 4, in which said vent valve includes a diaphragm actuated valve member and an ambient air inlet normally closed by said valve member, said vacuum conduit communicating with said vent valve adjacent the ambient air inlet.

6. A transient brake control system as set forth in claim 5, including a by-pass in said branch conduit around said restricted orifice, and a check valve in said by-pass preventing flow through said by-pass toward said actuator.

7. A transient brake control system as set forth in claim 6, in which said dashpot includes a reciprocable piston operatively connected with said engine control means and a conduit extending between said dashpot and the side of the vent valve diaphragm opposite to said inlet, and an ambient air inlet having a restricted orifice communicating with said last-named conduit.

8. A transient brake control system as set forth in claim 7, including resilient means acting to yieldably retract the engine control means to the engine idling position.

9. A transient brake control system as set forth in claim 8, in which the gradual release of said engine control means from an engine speed-up position to the engine idling position provides gradual movement of the piston in the dashpot, whereas a sudden release of said engine control means allows a sudden movement of the dashpot piston creating a vacuum behind the vent valve diaphragm to open said ambient air inlet, which in turn vents the actuator chambers to atmospheric pressure, said restricted orifice in said branch line creating a pressure imbalance in the actuator causing the piston therein to actuate the brake control means.

10. A transient brake control system as set forth in claim 9, in which said actuator action on said brake control means is momentary and then gradually fades as the restricted orifice in said branch line allows a gradual equalization of pressure in the two chambers of the actuator.

11. A transient brake control system for an automotive vehicle having an engine fuel feeding system and a braking system, comprising a control means for the engine fuel feeding system movable between an engine idling position and engine speed-up positions, a separate control means for the vehicle braking system, an actuator for the braking system including a diaphragm operatively connected to said brake control means, a pair of chambers formed on opposite sides of the diaphragm and communicating with a source of vacuum to equalize the pressure in both chambers, a vent valve adapted to be actuated by operation of said engine control means, a vacuum conduit communicating with said vacuum source and extending between one of said chambers and said vent valve, a branch line extending between the opposite chamber and said conduit and having a restricted orifice therein, a by-pass in said branch line around the restricted orifice, and a check valve in said by-pass preventing flow through said by-pass toward said opposite chamber.

* * * * *

UNITED STATES PATENT OFFICE
CERTIFICATE OF CORRECTION

PATENT NO. : 3,891,071
DATED : June 24, 1975
INVENTOR(S) : John J. Tuzson

It is certified that error appears in the above-identified patent and that said Letters Patent are hereby corrected as shown below:

Column 2, line 32, "brake actuator 25" should read -- "brake actuator 24".

Column 3, line 11, change "casuses" to -- causes --.

Signed and Sealed this twenty-fifth Day of November 1975

[SEAL]

Attest:

RUTH C. MASON
*Attesting Officer*

C. MARSHALL DANN
*Commissioner of Patents and Trademarks*